Aug. 3, 1943.   G. W. BLAIR ET AL   2,325,903
METHOD OF MAKING SPONGE RUBBER MATERIAL
Original Filed Aug. 11, 1937   3 Sheets-Sheet 1

Inventors.
George W. Blair &
Virgil H. Bodle.
By Eugene M. Giles Atty.

Aug. 3, 1943.    G. W. BLAIR ET AL    2,325,903
METHOD OF MAKING SPONGE RUBBER MATERIAL
Original Filed Aug. 11, 1937    3 Sheets-Sheet 2
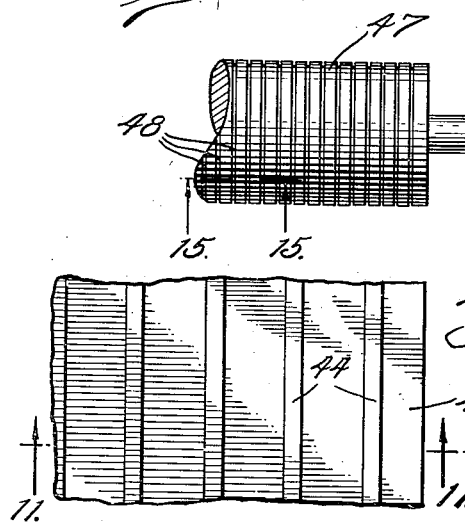
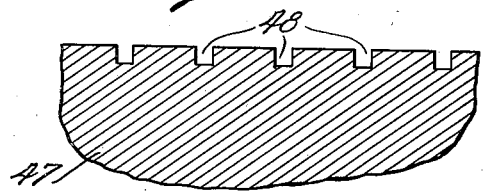
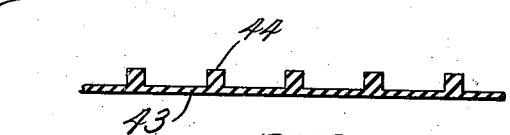
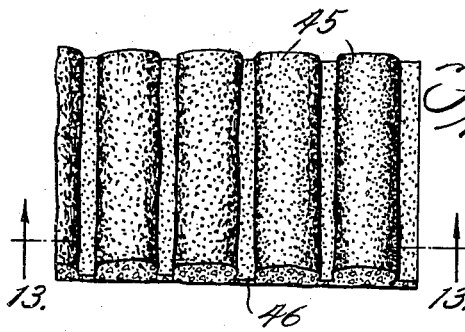
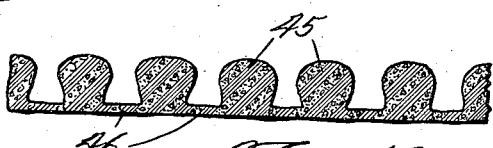
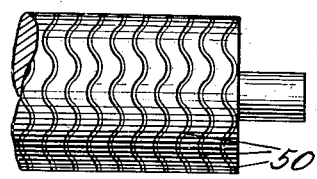
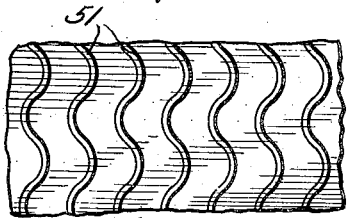
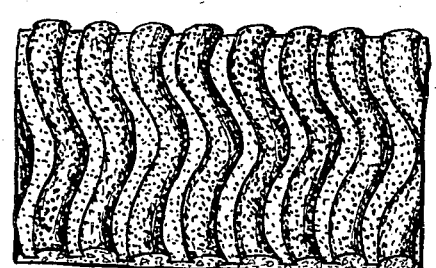
Inventors:
George W. Blair &
Virgil H. Bodle.
By Eugene M. Giles Att'y.

Aug. 3, 1943.　　　G. W. BLAIR ET AL　　　2,325,903
METHOD OF MAKING SPONGE RUBBER MATERIAL
Original Filed Aug. 11, 1937　　3 Sheets-Sheet 3

Inventors.
George W. Blair +
Virgil H. Bodle
By Eugene M. Giles Atty.

Patented Aug. 3, 1943

2,325,903

UNITED STATES PATENT OFFICE 2,325,903

METHOD OF MAKING SPONGE RUBBER MATERIAL

George W. Blair and Virgil H. Bodle, Mishawaka, Ind., assignors to Mishawaka Rubber and Woolen Manufacturing Company, Mishawaka, Ind., a corporation of Indiana Continuation of application Serial No. 158,465, August 11, 1937. This application September 20, 1941, Serial No. 411,750

20 Claims. (Cl. 18—53)

Our invention relates to sponge rubber or the like and has reference more particularly to improvements in cushioning, insulating or other similar materials made therefrom and the method of making such materials—for example, underpadding or backing for floor coverings, mats, upholstery and the like—wherein the material is formed with ribs, projections or other formations of the sponge rubber suitably spaced or distributively arranged for cushioning, insulating, ornamentation or other desired purposes. This application is a continuation of our application Serial No. 158,465, filed August 11, 1937.

In the manufacture of sponge rubber materials or articles, it is the practice to shape and vulcanize the rubber in molds in order to give it the desired form or configuration—rubber in masticated form being usually employed and compounded with a leavening agent which, when subjected to heat in the incipient stages of vulcanization, forms gas bubbles throughout the mass of rubber which is thus expanded into cellular or sponge like form so that it assumes the shape of and completely fills the mold. Because of the length of time required for vulcanization, a large amount of molding equipment, which materially increases the cost of the product, is necessary for quantity production and moreover, on account of the confining of the rubber in a mold, free and complete expansion of the rubber does not occur and accordingly the maximum soft cushioning characteristics are not assured. Furthermore, the heat for blowing and curing cannot be communicated directly to the rubber from the heating medium but must be transmitted through the mold walls and any spaces that are present between the mold walls and the rubber before the rubber is expanded sufficiently to fill the mold and this not only prevents accurate control of the applied heat but also interferes with uniformity and rapidity of heat penetration.

With our invention blown rubber articles or materials having ribs, projections or other formations suitably arranged for cushioning, insulating, ornamentation or other purposes are made without the necessity of employing molds to confine and shape the rubber in the blowing operation and during the curing thereof, this being accomplished by preforming the sponge rubber stock with suitable initial formations so that by merely blowing or expanding the rubber stock in the open within a vulcanizer or other heated compartment, these formations swell or expand and produce the ribs, projections or other formations that are desired in the finished product, these ribs, projections or other formations being thus of a "free blown" type (and referred to herein as such) as distinguished from formations that are blown within a mold which imparts the shape to the blown product.

The principal objects of our invention are to provide an improved material or product of spongy type rubber or the like and method of making same; to simplify and facilitate the manufacture and minimize the cost of such materials or products; to eliminate molds; to permit free and complete expansion of the spongy material; to provide a method which is particularly adaptable to continuous production and by which any desired ribs, projections or other formations may be readily produced; to produce the ribs, projections or other formations by calendering or otherwise shaping the stock before expansion so that it acquires ribs, projections or other formations of the desired form and arrangement by the subsequent expansion of the stock; to permit composite materials of the spongy rubber to be readily produced with reinforcing, fabric coverings, rubber tread layers and the like, and to insure accurate control and rapid uniform penetration of the applied heat; these and other objects being accomplished as pointed out in the following description wherein reference is made to the accompanying drawings, in which:

Figure 19:
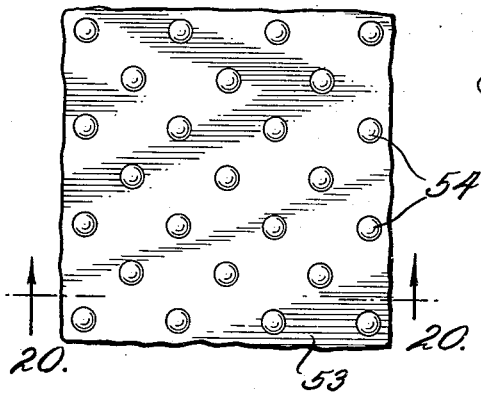
Figure 20:
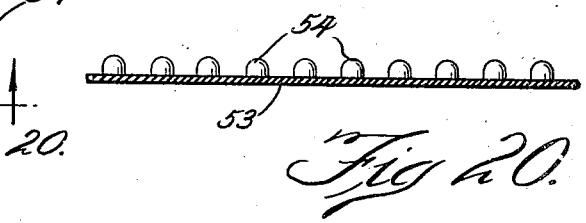
Figure 21:
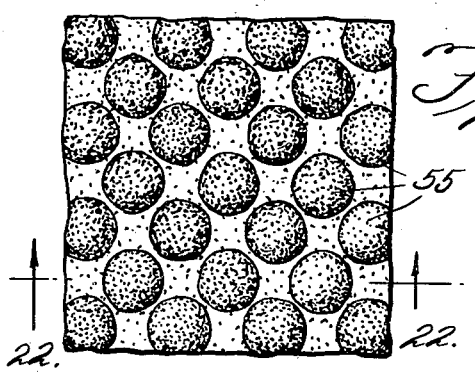
Figure 22:
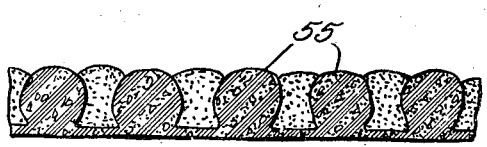
Figure 24:
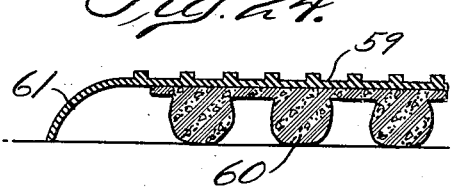
Figure 23:
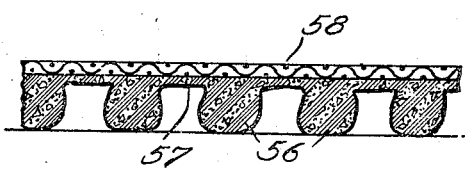
Figure 25:
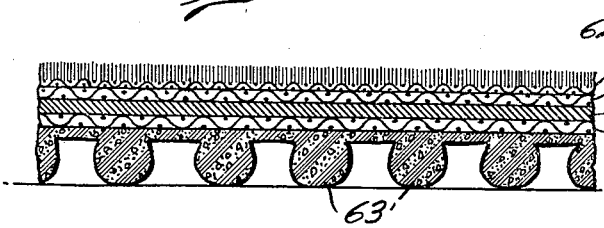

Figs. 10, 11, 12 and 13 are views similar to Figs. 1, 2, 3 and 4 respectively showing calendered stock and the blown product with a different arrangement of ribs; Fig. 11 being a section on the line 11—11 of Fig. 10 and Fig. 13 being a section on the line 13—13 of Fig. 12;

Fig. 14 is a fragmentary view of a calender roll with plain circumferential grooves for preforming the stock in the manner shown in Figs. 10 and 11;

Fig. 15 is an enlarged fragmentary sectional view of the roll of Fig. 14 taken on the line 15—15;

Figs. 16 and 17 are side views of preformed stock and the blown product respectively wherein sinuously arranged parallel ribs are employed;

Fig. 18 is a fragmentary view of a calender roll for producing the sinuous ribs of Fig. 16;

Fig. 19 is a plan view of a piece of sponge rubber stock with a different form of projections;

Fig. 20 is a sectional view of the stock of Fig. 19 taken on the line 20—20;

Fig. 21 is a plan view of the blown product produced from the preformed stock of Figs. 19 and 20;

Fig. 22 is a sectional view taken on the line 22—22 of Fig. 21;

Fig. 23 is a fragmentary sectional view of a reinforced sponge rubber pad made in accordance with this invention;

Fig. 24 is a similar view of a structure suitable for automobile mats made with a sponge rubber base in accordance with the present invention; and Fig. 25 is a similar view of a multi-ply fabric faced material made with a sponge rubber backing in accordance with this invention.

Figure 1:
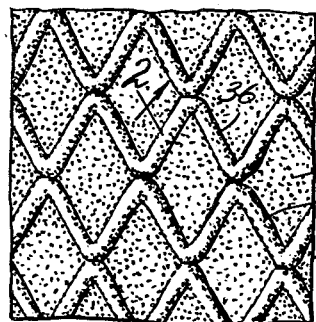
Fig. 1 is a side view of a piece of sponge rubber stock calendered to produce a ribbed cushion material suitable for underpadding or backing for floor coverings.
Figure 2:
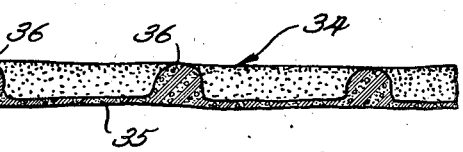
Fig. 2 is an enlarged sectional view on the line 2—2 of Fig. 1.
Figure 3:
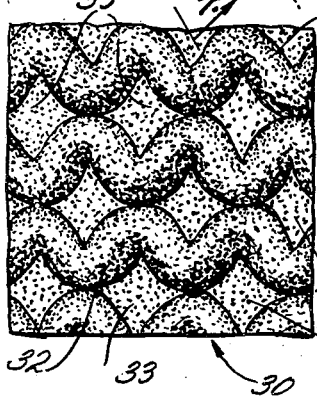
Fig. 3 is a side view of the sheet rubber stock of Figs. 1 and 2 after it is blown or expanded into the sponge form.
Figure 4:
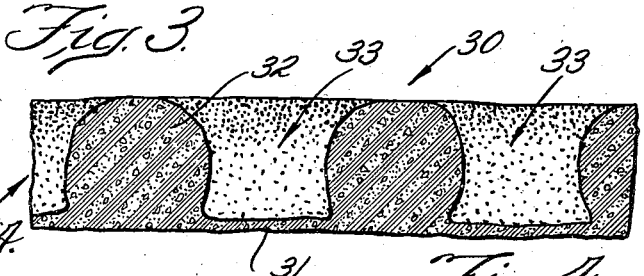
Fig. 4 is an enlarged sectional view on the line 4—4 of Fig. 3.

Referring to the drawings which illustrate a few of the forms in which the invention may be embodied, and considering first Figs. 1 to 8 inclusive which show one such form and the preferred manner in which it may be made, the reference numeral 30 indicates a piece of the finished product which may be of any desired extent or area and, as shown in Figs. 3 and 4, comprises a thin sheet 31 of sponge rubber having on one side thereof thick interconnected sponge rubber ribs 32 throughout the area thereof with spaces or voids 33 between the ribs so that the material is in effect an open type or grid like pad of relatively thick interconnected sponge rubber ribs, the openings or voids 33 between which merely having a thin web (31) of the sponge rubber at the bottom.

It is an important feature of this invention to make such materials without the necessity of shaping and curing in molds and to this end sponge rubber stock, such as masticated rubber compounded with a leavening agent which causes it to blow or expand into spongy or cellular form when exposed to heat, is preformed, before blowing, with initial formations which when exposed to proper temperature, will expand by the action of the leavening agent in the open without confinement in a mold, to the form and size desired in the finished product. Accordingly, for making the blown or expanded sponge rubber material of Figs. 3 and 4, sponge rubber stock compounded with a leavening agent is preformed, before blowing, as shown at 34 in Figs. 1 and 2 in the form of a thin sheet 33 with incipient ribs 36 on one side thereof suitably arranged and of a shape and size so that when subjected to heat they will expand and vulcanize and produce the sponge or cellular ribbed structure of Figs. 3 and 4.

Figures 5, 8:
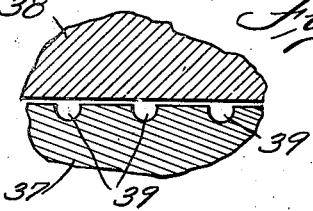
Fig. 5 is a view, somewhat diagrammatic, illustrating the calendering operation which is preferably employed for preforming the stock to produce the ribs, projections or other formations in the blown product.
Fig. 8 is a fragmentary sectional view of said roll and the companion roll of the calender.

Preferably the sponge rubber stock is prepared in the initial or preliminary form by calendering as indicated in Fig. 5 between rolls 37 and 38, which are set close together as indicated in Fig. 8 and one of these rolls, for example the roll 37, is engraved or formed with intersecting grooves 39 so that as the compounded rubber mass 40 is passed between the rolls 37 and 38 it is shaped thereby and emerges therefrom in the form of a ribbed sheet 34 comprising a thin sheet portion 35 with ribs 36 on one side thereof as shown in Figs. 1 and 2 and is ready for blowing and curing.

In the blowing and curing operations the material 34 is merely supported on a surface with the thin sheet portion 35 thereof against the supporting surface and the ribs 36 projecting upwardly therefrom and while thus supported the material is exposed to the proper temperatures for blowing and curing while free to expand without restriction. Any suitable facilities may be employed for subjecting the material to such temperatures—for example sections of the material 34 may be placed on plates or screens, preferably of material that will permit ready communication of heat to the bottom of the material 34, and these plates or screens with the ribbed rubber 34 thereon may be mounted on racks in the chamber or compartment of an ordinary vulcanizer so that they are spaced apart sufficiently to permit the heating medium in the vulcanizer chamber to circulate therebetween and the ribbed rubber to expand freely without restriction.

Figure 9:
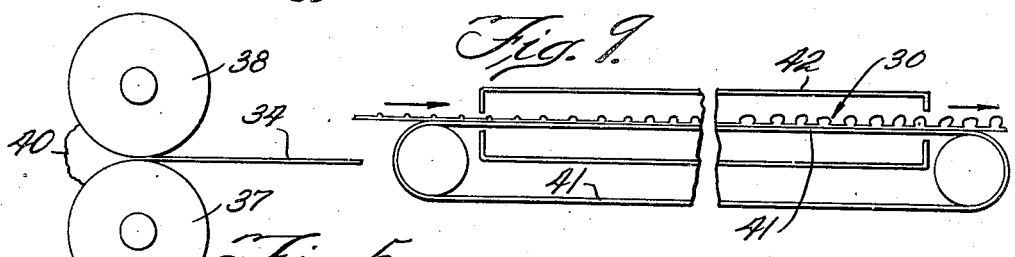
Fig. 9 is a sectional view, somewhat diagrammatic and partly broken away showing facilities for blowing and curing the material.

It is preferable, however, to produce such sponge material by a continuous process in long sheets or lengths by feeding the ribbed rubber 34 from the calendar onto the upper length of a conveyor belt 41 (see Fig. 9) which travels at a speed corresponding to that of the calendar rolls 37 and 38 and passes through a heating compartment 42 which is of suitable length and properly heated so as to expand the ribbed rubber 34 in its early progress within the heating compartment 42 and thereafter cure it in the fully expanded form before it leaves said compartment, it being understood that the belt 41 is preferably of a material which permits heat to be readily communicated to the bottom of the sheet of rubber material supported thereon.

For making blown rubber materials in accordance with this invention we employ a rubber compound of the following formula:

| | |
|---|---|
| #3 smoked sheet rubber ground 40 plasticity on Mooney plastometer | 36 lb., 8 oz. |
| Laurex-zinc laurate | 5½ oz. |
| 304 reclaim (made from inner tubes) | 4 lb. |
| Ultramarine blue (coloring) | 4 oz. |
| Lamp black | ⅘ oz. |
| Red iron oxide | 1⅗ oz. |
| Whiting | 10 lb. |
| Soda bicarb | 16 lb. |
| Stearic acid | 8 lb. |
| Paraffin oil | 7 lb., 8 oz. |
| Paraffin wax | 1 lb. |
| Zinc oxide | 2 lb. |
| Pine tar | 1 lb. |
| Antioxidant | 8 oz. |
| Accelerator | 7½ oz. |
| Sulfur | 1 lb., 8 oz. |

These materials are mixed in an open mill and when thoroughly combined the plastic compound is calendered in the preliminary form for blowing, as for example in the intersecting rib form of Figs. 1 and 2, and then applied on a suitable surface such as the belt 41 which supports the material during the blowing and curing thereof.

For the blowing and curing operations the supported rubber material is subjected to heated air at a gradually increasing temperature which starts at approximately 200° F. and is gradually increased during about twenty minutes to approximately 290° F. after which the latter temperature is continued for approximately twenty minutes or until the rubber material is sufficiently cured. A small amount of steam is introduced into the heated air, for example through a jet, a few minutes after the beginning of the heat treatment when the air temperature has reached approximately 240° F. and the supply thereof is continued thereafter throughout the heat treamtent. Obviously when performing the heat treatment in an ordinary vulcanizing compartment the changes of temperature and addition of steam take place throughout the entire compartment at appropriate times during the heat treatment of the batch whereas in the continuous process as exemplified by Fig. 9 the heat will be locally controlled throughout the length of the compratment 42 and steam supplied at a certain place or places therein so that the different temperature and moisture conditions are maintained at appropriate places throughout the length of the compartment so that the rubber material, during its progress through the compartment 42, is subjected for the proper length of time to the required variations in temperature and moisture conditions to properly expand and cure the rubber.

The blowing or expanding of the rubber composition occurs during the gradually increasing temperature stage of the heat treatment and largely after the admission of the steam which not only tends to soften the stock so that it expands readily, but also causes an incipient surface cure that tends to confine the gases produced by the leavening agent (sodium bicarbonate of the formula) and thus insure maximum expansion. Moreover, since the rubber stock is directly exposed to the heating medium the temperature of the applied heat may be accurately controlled, the heat application is uniform throughout the exposed surfaces of the rubber stock and the heat penetration quite rapid, it being understood as pointed out hereinbefore that the surface on which the rubber is supported during the heat treatment is preferably such that the heat is readily communicated therethrough to the rubber.

Since the rubber is unconfined, the rubber formations thereof, namely the ribs 36 of the rubber stock 34, are free to expand without restriction not only upwardly but also laterally at both sides, and as the heat is applied uniformly throughout the surfaces of these formations and communicated quite readily to the bottom surface of the stock, maximum and uniform expansion of the rubber formations occurs and results in an extremely light and soft product which not only has exceptional cushioning and insulating properties but may be manufactured at a minimum expense since no molds are required in the blowing or curing operations.

The web portions 35 of the stock also expand during the heat treatment and may wrinkle to some extent depending upon the degree of adherence thereof to the surface upon which the rubber stock is supported. By applying the stock onto the supporting surface so that these web portions adhere quite firmly thereto, or by laminating the stock onto a fabric or reinforcing as in modifications hereinafter described any wrinkling of these web portions may be entirely avoided.

Other formations may be employed, as will be readily understood, instead of the intersecting ribs of Figs. 1 and 2 for producing cushioning or insulating materials in accordance with this invention, several examples of which are disclosed in the drawings which in Figs. 10 and 11 show the rubber stock preformed in a thin sheet 43 with parallel ribs 44 which upon blowing and curing, expand and form thick soft parallel ribs of spongy rubber as indicated at 45 in Figs. 12 and 13 connected at their base by thin strip 46 of the sponge rubber.

Figures 6, 7:
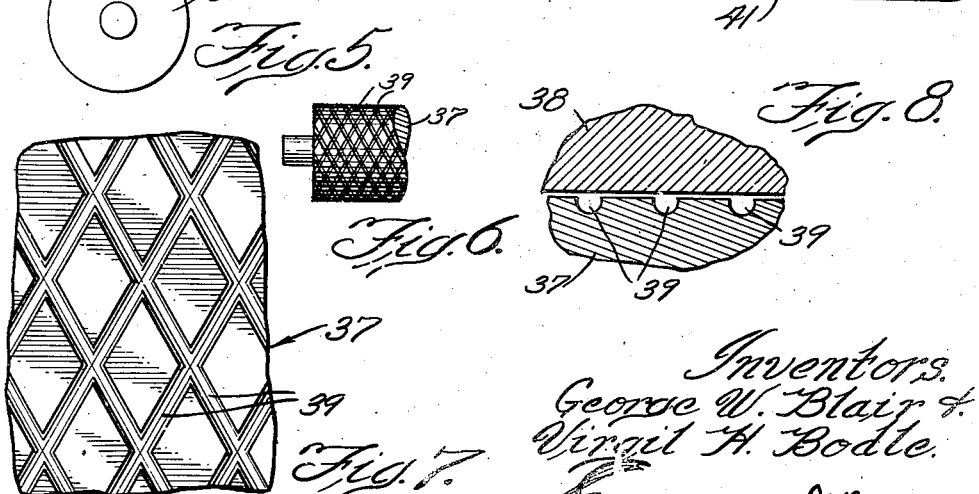
Fig. 6 is a fragmentary view of a calender roll with grooves for preforming the stock in the manner shown in Figs. 1 and 2.
Fig. 7 is an enlarged fragmentary surface view of the calender roll of Fig. 6.

The rubber stock for making the sponge material of Figs. 12 and 13, like the stock for the sponge material of Figs. 3 and 4, is preferably calendered by employing a calender roll 47 with circumferential grooves 38 as shown in Fig. 14, and these grooves may be square ribs 44 on the rubber sheet 43 or they may be rounded like the grooves 30 of the calender roll shown in Figs. 6, 7 and 8 or of any other desired form. Moreover, by varying the spacing of the grooves 46 the relative arrangement of the sponge rubber ribs 45 in the finished product may be varied so that there are any desired intervals therebetween, or the ribs 45 may be in close contacting relation to provide in effect a sponge layer of substantially uniform thickness throughout.

Instead of forming the rubber stock with straight ribs as in Fig. 10, the calender roll may have circumferential sinuous grooves 50 as shown in Fig. 18 to produce parallel sinuous ribs as indicated at 51 in Fig. 16 which when blown or expanded provide corresponding sinuous sponge rubber ribs on the finished product as indicated at 52 in Fig. 17. Moreover, instead of employing ribs, other formations may be provided, for example as shown in Figs. 19 and 20 the thin rubber sheet 53 may be calendered with a multiplicity of projections 54 suitably spaced so that when blown or expanded a product such as shown in Figs. 21 and 22 is provided with closely arranged sponge rubber projections 55 throughout the area thereof.

Furthermore, while we prefer to calender the ribs, projections or other formations on the thin rubber sheet as the latter is formed, a plain thin rubber sheet may be calendered after which pellicles or strands of the rubber stock may be deposited thereon to provide projections or ribs, or a sheet of fabric or other material may be employed instead of the thin rubber sheet and have the ribs, projections or other formations deposited or calendered thereon and thereafter blown or expanded and vulcanized in the same manner as in the case of the other materials more particularly described herein. Moreover, the material may be made with ribs or projections on both sides instead of only one side.

Fig. 23 shows sponge rubber material of the character hereinbefore described composed of sponge rubber ribs 56 and intermediate web portions 57 secured on a backing 58 of burlap or other material such as a paper twine cloth. While the sponge rubber stock may be calendered on the backing 58 or the ribs or projections 56 merely deposited on the backing, we prefer to prepare the rubber stock separately as a thin rubber sheet with ribs or projections thereon and then adhesively secure same to the backing, which is preferably cement coated on both sides, after which the composite fabric backed sponge rubber stock is, like the sponge rubber stocks hereinbefore described, subjected to blowing and curing temperatures while supported on a belt or otherwise, it being understood of course, that in the blowing and curing operations the fabric side 58 of the material is next to the belt or other supporting surface and the ribs 56 project upwardly therefrom.

Sponge rubber materials such as disclosed herein, are particularly suitable for backing for automobile mats and the like because of the soft cushioning effect and heat insulating properties thereof. An example of such mat is shown in Fig. 28 wherein the reference numeral 50 indicates the usual solid rubber tread layer such as commonly employed in such mats while the reference numeral 60 indicates a ribbed sponge rubber pad prepared in the manner hereinbefore described and which may be secured to the underside of the rubber tread 50 by cementing or in other convenient manner, the rubber tread being preferably extended beyond the edge of the backing 60 and preformed with a downwardly curved margin as indicated at 61 to surround the pad 60 thereunder.

The sponge rubber materials shown and described herein may also be used for various other purposes, as for example as a backing to cushion upholstering materials as shown in Fig. 25 in which the reference numeral 62 indicates a mohair covering and 63 the sponge rubber material produced by blowing in the open in the manner hereinbefore described. Preferably other layers of material are interposed between the mohair 62 and sponge backing 63 as for example, the layers 64 and 65 of burlap with a layer 66 therebetween of gum heavily loaded with fibres which said layer 66 is employed to insure that the mohair lays smooth and to prevent any trace of the ribbed structure of the underlying sponge rubber appearing therethrough, and the various layers of the material may be cemented or otherwise secured together and the sponge rubber blown and cured with one or more layers of the other materials attached thereto as desired.

While we have shown and described our invention in a preferred form, we are aware that various changes and modifications may be made therein without departing from the principles of our invention, the scope of which is to be determined by the appended claims.

What we claim is:

1. The method of making sponge rubber floor covering material which includes the step of forming a sheet of blowable sponge rubber compound and the subsequent separate step of blowing and expanding the sheet freely and unobstructedly to full blown sponge rubber thickness.

2. The method of making sponge rubber floor covering material which comprises the step of calendering blowable sponge rubber compound into a sheet, and the separate subsequent step of blowing and expanding the sheet freely and unobstructedly to full blown sponge rubber thickness by exposure thereof on a temporary flat support to a heated atmosphere.

3. The method of making sponge rubber floor covering material which comprises the step of calendering blowable sponge rubber compound into a sheet, and the separate subsequent step of blowing and expanding the sheet freely and unobstructedly to full blown sponge rubber thickness by enveloping the sheet in a heated atmosphere while temporarily on a ventilated support.

4. The method of making sponge rubber floor covering material which comprises calendering blowable sponge rubber compound into a sheet, then while supporting the sheet in a flat manner on a heat permeable support, enveloping the support and sheet in a heated atmosphere and thereby blowing and expanding the sheet freely and unobstructedly to full blown thickness.

5. The method of making a sheet of sponge rubber material which includes the step of calendering a sheet of blowable sponge rubber compound with areas thereof throughout the surface differentially blowable to produce a relief design, and then blowing and expanding said sheet freely and unobstructedly to produce the relief design.

6. The method of making spongy materials of the class described which comprises preforming unblown plastic material with a predetermined arrangement of laterally adjacent formations and thereafter unobstructedly blowing and expanding said formations freely to full blown form.

7. The method of making spongy materials of the class described which comprises preforming unblown plastic material with a predetermined arrangement of laterally adjacent formations, and thereafter blowing and expanding said formations freely to full blown form while individually unconfined.

8. The method of making spongy materials of the class described which comprises preforming unblown plastic material with a predetermined arrangement of laterally adjacent formations, and thereafter blowing and expanding said formations freely to full blown form while individually unconfined and curing the full blown formations.

9. The method of making spongy materials of the class described which comprises forming unblown plastic material in a thin sheet with spaced formations projecting from one side thereof, then blowing and expanding said spaced formations freely to full blown form unaccompanied by external imposition of final shape thereto, and curing the blown material to give it a permanent set.

10. The method of making spongy materials of the class described which comprises forming plastic material containing a leavening agent in a thin sheet with spaced ribs or projections throughout the surface thereof, then applying the sheet on a supporting surface with the ribs or projections thereof unconfined and free to expand freely and unobstructedly to full blown form, then subjecting the material while supported and unconfined to a temperature to cause the leavening agent to blow and expand the ribs or projections, and then curing the material to give it a permanent set.

11. The method of making spongy materials of the class described which comprises applying on one side of a backing sheet and substantially throughout the area thereof spaced ribs or projections of an unblown plastic material, then blowing and expanding said ribs or projections freely and unobstructedly to full blown form, and then curing said blown plastic material so as to give it a permanent set.

12. The method of making sheets of spongy material which comprises calendering unblown plastic material in a sheet with ribs or projections on one side and substantially throughout the area therof and then unobstructedly blowing and expanding the ribs or projections freely to full blown form by passing said sheet through a heated medium to which the ribs or projections are directly exposed.

13. The method of making a padding of spongy rubber like material which comprises preliminarily forming a sheet of blowable plastic material with laterally spaced formations and then by application of heat thereto blowing and expanding said formations freely into full blown spongy cellular form unaccompanied by external imposition of final shape thereto.

14. The method of making material of the class described which comprises preparing a sheet of material with laterally spaced formations of blowable plastic compound, then internally blowing and expanding said formations freely to full blown form unaccompanied by external imposition of final shape thereto, and then vulcanizing the formations in the free blown form.

15. The herein described method which comprises calendering unvulcanized blowable rubber material into sheet form with a plurality of spaced surface elevations of the unvulcanized blowable rubber material thereon, and then while passing the sheet through a heating zone, subjecting the sheet and the elevations to directly applied fluid at a blowing temperature, and permitting free and unconfined expansion of the elevations to fully blown form under the action of the blowing temperature.

16. The method of making blown sponge rubber material which comprises calendering blowable sponge rubber compound in a sheet, then while traveling flat through an oven, subjecting the sheet to a heated atmosphere and blowing and expanding the sheet freely and unobstructedly to full blown thickness.

17. The herein method which comprises the calendering of unvulcanized blowable rubber material into sheet form, providing a plurality of spaced surface elevations of unvulcanized blowable rubber material upon the sheet, and then while passing the sheet through a heating zone, subjecting the sheet and the elevations to directly applied fluid at a blowing temperature and permitting free and unconfined expansion of the elevations to fully blown form under the action of the blowing temperature.

18. The herein described method which comprises the calendering of unvulcanized blowable rubber material into sheet form and simultaneously providing the sheet with a plurality of spaced surface elevations of unvulcanized blowable rubber material, then passing the sheet through a heating zone, subjecting the sheet and the elevations while traveling through the heating zone to air at a blowing temperature, permitting unlimited expansion of the elevations in a plurality of directions under the action of the blowing temperature while the sheet is traveling through the heating zone, and gradually increasing the temperature of the air along the path of travel of the sheet through the heating zone to a vulcanizing temperature.

19. The method of making sponge rubber floor covering material which includes the step of calendering a layer of blowable sponge rubber compound on a loose woven fabric, and the subsequent separate step of blowing and expanding said layer freely and unobstructedly to full blown sponge rubber thickness.

20. The method of making a composite fabric and spongy rubber padding which comprises the step of preparing a laminated assembly with a layer of blowable sponge rubber compound on a sheet of loose woven fabric, and the separate subsequent step of blowing and expanding the layer freely and unobstructedly to full blown sponge rubber thickness by enveloping the assembly in a heated atmosphere on a ventilated support through which the heated atmosphere is applied directly to the assembly.

GEORGE W. BLAIR.
VIRGIL H. BODLE.